United States Patent
Vančurová

(10) Patent No.: US 9,657,179 B2
(45) Date of Patent: May 23, 2017

(54) POWDER WATERCOLOUR PAINT

(71) Applicant: KOH-I-NOOR HARDMUTH a.s., České Budějovice (CZ)

(72) Inventor: Marta Vančurová, Řečany nad Labem (CZ)

(73) Assignee: Koh-I-Noor Hardmuth A.S., Ceske Budejovice (CZ)

( * ) Notice: Subject to any disclaimer, the term of this patent is extended or adjusted under 35 U.S.C. 154(b) by 0 days.

(21) Appl. No.: 15/226,666

(22) Filed: Aug. 2, 2016

(65) Prior Publication Data

US 2017/0114228 A1    Apr. 27, 2017

(30) Foreign Application Priority Data

Jun. 3, 2015 (CZ) .................................. 2015-31166

(51) Int. Cl.
*C09D 5/03* (2006.01)
*C09D 5/06* (2006.01)

(52) U.S. Cl.
CPC ............. *C09D 5/035* (2013.01); *C09D 5/031* (2013.01); *C09D 5/06* (2013.01)

(58) Field of Classification Search
None
See application file for complete search history.

(56) References Cited

U.S. PATENT DOCUMENTS

| 5,281,269 | A | * | 1/1994 | Ganci | C09B 48/00 106/400 |
| 5,356,617 | A | * | 10/1994 | Schlossman | A61K 8/0204 424/401 |
| 6,573,327 | B1 | * | 6/2003 | Shibutani | C08F 2/20 524/557 |
| 9,139,676 | B2 | * | 9/2015 | Yang | C08F 218/08 |
| 2006/0067867 | A1 | * | 3/2006 | Ishibashi | C01B 33/18 423/335 |
| 2010/0154680 | A1 | * | 6/2010 | Friedrich | C09C 1/44 106/668 |
| 2011/0311470 | A1 | * | 12/2011 | Cherette | A61K 8/022 424/69 |

FOREIGN PATENT DOCUMENTS

JP    2003-300009    * 10/2003

* cited by examiner

*Primary Examiner* — Melvin C Mayes
*Assistant Examiner* — Colette Nguyen
(74) *Attorney, Agent, or Firm* — Myers Wolin, LLC

(57) ABSTRACT

A powder watercolor paint is provided for achieving special color effects, wherein the paint comprises a powder filler having hydrophobic treatment and particles of an aqueous liquid colored base containing 0.5 to 10% by weight of colored pigment or pigment paste, 1.5 to 5% by weight of natural or synthetic gum, and 1 to 5% by weight of a hydrophobizing oil ingredient.

12 Claims, No Drawings

POWDER WATERCOLOUR PAINT

CROSS REFERENCE TO RELATED APPLICATIONS

This application claims priority under 35 U.S.C. §119 to Czechoslovakian Patent Application No. 2015-31166, filed Jun. 3, 2015, the contents of which are incorporated by reference herein.

FIELD OF THE INVENTION

The technical solution relates to powder watercolour paint for achieving special colour effects, wherein the aqueous liquid coloured base is coated by special powder filler. The result is a relative dry powder mixture of small particles of a variable size that are spread separately during the application.

BACKGROUND OF THE INVENTION

The available range of paints for simple painting is relatively wide at present.

Depending on the binder type contained in the paint base they can be divided into several basic categories:
  a) oil paint—slow drying matter consisting of pigment particles suspended in drying oil; cannot be diluted with water
  b) tempera paint—relatively quick-drying matter where the pigment with filler is dispersed in an aqueous oil emulsion, can be diluted with water even after drying, suitable for use by children as well
  c) gouache paint—strongly pigmented cover paint where as the binder a solution of natural gum is used; can be diluted with water even after drying
  d) solid watercolour paint—solid tablets of a mixture of a starch-based pigment and binder, applicable with water; can be diluted with water even after drying, suitable for children as well
  e) liquid watercolour paint—a thinner aqueous mixture of a pigment and filler concentrated with a natural thickener; can be diluted with water even after drying, suitable for children as well
  f) acrylic paint—dispersion based on a polymeric resin dispersed in water that can only be diluted with water before drying up.

All the above mentioned paints are generally available in the form of homogeneous thinner or thicker paste (solid tablet) of one colour hue at a time, which are relatively easily miscible with each other. Common mixing of diluted paint or directly the original matter provides another homogeneous colour hue from the two original homogeneous hues (e.g. yellow+blue=green). However, this fact is limiting if more hues are to be achieved in painting at the same time, and mixing of the original hues is not desirable.

For painting it would be very effective to have paints that would not, after application of several such paints of different colour hues at the same time, produce homogeneous paint of another hue when mixed, but being applied on the substrate they would provide fast-coloured effects maintaining the original colour hues that can only be influenced by adding of paint of a different hue. However, in such a case immiscibility of the original ingredients/matters, or of the original colour hues applied onto the substrate needs to be achieved. At the same time the paints must exhibit a sufficient storage stability.

SUMMARY

The technical solution relates to powder watercolour paints, in which in case of combined application of paints of different colour hues onto a substrate, the colour hues will not mix, and a different colour hue will not arise. Thus, the present paint represents a type of a single coloured composition that is immiscible with other colour hues.

The final mixture consists of two basic ingredients: fine powder filler having hydrophobic treatment and an aqueous liquid coloured base in the form of droplets that is coated by said filler. When applied on a substrate, this paint in the form of a stable droplet/powder system maintains immiscibility of the colour hues used, which enhances attractiveness of the work with paints during painting, especially for children. The filler preferably has a white colour.

Preparation of this powder watercolour paint consists first in preparation of the basic aqueous liquid coloured base, which is, in the second step, dispersed/coated in a special filler to produce small (preferably on average smaller than 5 mm) loose particles of the aqueous liquid coloured base coated by the filler.

Thus, the powder watercolour paint according to the present technical solution contains
  a) powder filler with hydrophobic treatment and in it encased/dispersed
  b) particles of the aqueous liquid coloured base containing in each case, based on the ingredient b), 0.5 to 10% by weight of coloured pigment or pigment paste, 1.5 to 5% by weight of natural or synthetic gum (thickener and binder at the same time), 1 to 5% by weight of a hydrophobizing oil ingredient, the balance up to 100% by weight of the ingredient b) consists of water and optionally other common additives for aqueous paint systems,
     where the ratio is 5 to 20 weight parts of the ingredient b) to each 1 weight part of the ingredient a).

The ingredient b) can additionally contain up to 5% by weight of white pigment or pigment paste.

The powder filler is preferably dry. The dry filler means powder material having a sufficiently low content of water so that it can be free flowing, should not form lumps and can be easily mixed with the aqueous liquid coloured base. The water content depends on the used material; the content of water of the powder filler with hydrophobic treatment is preferably lower than 20% by weight, more preferably lower than 10% by weight and most preferably lower than 4% by weight.

Powder filler means fine, free flowing material that can be easily powdered onto a surface and when it is spread over the substrate with fingers, individual particles cannot be perceived. The average particle size corresponding to this requirement is less than 100 µm, preferably less than 50 µm and most preferably less than 10 µm.

The fine powder filler can be ground powder of mineral of natural origin as oxides, silicates or aluminosilicates, or their hydrated forms. However, to achieve the required characteristics, homogeneity and reproducibility, synthetic materials are more advantageous, e.g. precipitated silica.

The hydrophobic (water repellent) treatment refers e.g. to treatment by impregnation of the powder filler in any suitable manner, with the use of a non-polar natural or synthetic substance immiscible with water. As examples of such a substance, natural or synthetic solid or liquid hydrocarbons (with longer carbon chains, as C8 to C18), waxes, fats, oils and synthetic siloxanes can be mentioned. Readyto-use materials with hydrophobic treatment with suitable properties are available in the market.

Thus, the fine powder synthetic filler with hydrophobic treatment can be preferably silicon dioxide with hydrophobic treatment.

For the aqueous coloured base a separate monochromatic aqueous base is prepared for each colour hue. The ingredient b) contains at least one pigment (paste), or possibly two or more colour pigments to achieve the desired hue.

The coloured ingredient is based on water, optionally with common additives used in aqueous systems (e.g. surfactants, preservatives), which is coloured to achieve the desired hue by using pigments or pigment pastes. An important component of the coloured base is the hydrophobizing oily component miscible with water. This is because we have surprisingly found out that the hydrophobizing oily component in the used quantity of 1 to 5% by weight of the ingredient b) increases affinity of the filler with hydrophobic treatment to the surface of the aqueous liquid coloured base to the just required extent (without this component the hydrophobic filler could not be easily dispersed with the coloured aqueous base to produce the powder paint), so that individual particles of the ingredient b) coated by dry filler remain long term stable during storage, particles of the same or different hue do not get mixed and lumps are not formed and the contents of the particles are easily released without inadequate effort only during application e.g. with a brush onto the substrate.

The hydrophobizing oily component is selected from substances forming stable emulsions with water as substances of the type of silicone oil, preferably based on polydimethyl siloxane.

The coloured base is thickened/bound by addition of natural or synthetic gum. Gums are natural or synthetic substances miscible with water used in painting, e.g. of the saccharide and glycoprotein character, as e.g. gum arabic and tragacanth, preferably guar gum and/or xanthan gum, and the result is homogeneous, unicoloured liquid matter.

The term liquid refers to a state from thinly liquid, through semi-liquid to gel-like matter of a corresponding viscosity, suitable for easy spreading of particles of the ingredient b) on the surface, e.g. 100 to 5000 mPa·s, preferably 200 to 1000 mPa·s.

Colour pigment is powder, natural or synthetic inorganic or organic pigment common in the art of paint production. Pigment paste is a common mixture used in the art of colour pigment with a suitable liquid miscible with water, which is e.g. water, mono- and polyhydric alcohols and their mixtures, in a quantity of 0.5-50% by weight, based on the pigment paste.

White dye refers to pigment/pigment paste of white colour.

The assumption is that during mixing, particles of the filler (ingredient a)) coat particles of the aqueous liquid coloured base (ingredient b)) produced during said mixing. The required degree of adhesion of powder to the aqueous phase and separation of individual colour particles is achieved by using of the hydrophobizing oil component added to the aqueous phase. During slow stirring, particles of a smaller diameter are gradually formed. These particles, coated by the dry filler, do not join back into the form of a homogeneous coloured matter. The coloured particles of the aqueous base retain their own colour hue even in case of mechanical mixing of some already prepared powder paints according to the technical solution in a container, but especially their hue does not change when they are spread with a dry brush on a paper.

The mean diameter of the produced particles of the ingredient b) of the dry aqueous powder paint is 0.5 to 5 mm, preferably 2 mm.

In its ingredient b), the powder watercolour paint can, if needed, contain other usual additives selected independently from the group containing a soluble dye, organic water miscible solvent, glycerol, organic or inorganic acid, sodium or potassium hydroxide, dispersing agent, defoaming agent, natural gum, carboxymethyl cellulose, pearling agent and metallic particles. Such additives can be selected by an expert without inadequate experimenting on the basis of his/her experience.

All the used ingredients of the aqueous powder paint are preferably harmless from the cosmetic point of view.

DETAILED DESCRIPTION OF THE PREFERRED EMBODIMENTS

According to this embodiment the powder watercolour paint consists of a fine powder synthetic filler with hydrophobic treatment and a pigmented coloured aqueous base that is stirred up (coated) in said filler in the form of small particles or pieces. The result is a whitish powder/granular single-coloured matter.

First, the aqueous liquid coloured base was prepared in such a way that the amount of 0.5 to 10.0 g (optimally 2 g) of red, yellow, green, blue or another pigment paste/pigment, or up to 5 g of white dye was gradually added into water until the desired hue was achieved. Further, the other additives were added, which were a dispersing agent, defoaming agent and preservative, 1.5 to 5 g of guar gum and 0, 1, 5 or 10 g of the hydrophobizing oil component polydimethyl siloxane, the balance up to 100 g was filled with water. All the ingredients were gradually intensively stirred.

The coloured base prepared this way is very slowly and carefully mixed with fine white filler with hydrophobic treatment, namely in a proportion of 5 to 20 weight parts of the coloured base to 1 weight part of the filler.

The result of very slow stirring at a low speed is a relatively dry freely flowing powder mixture, each time of a single colour hue of the paint, with the particle size of 1 to 2 mm. Said free flowing mixture with variable quantities of polydimethyl siloxane was tested for stability of the matter during storage. No change of consistence of the mixture was observed when stored for more than six months. Without added polydimethyl siloxane the hydrophilic/aqueous base virtually did not mix with the filler with hydrophobic treatment, rather the repelling action was observed. The mixture had to be stirred relatively intensively and for a long time and then the filler joined with the base, producing homogeneous coloured matter (paint particles coated by the filler were not formed).

On the other hand, when the hydrophobizing component was present, the filler got stuck to the surface of the coloured base and during stirring, coloured drops coated by the filler were formed relatively very easily and very quickly.

If the paint is carefully applied with a dry brush on a paper substrate, spreading of particles of the seemingly colourless dry mixture produces intensive colour traces while during spreading of more coloured mixtures/particles at the same time each hue is spread separately and the colour hues do not merge. Thus, depending on the degree of mixing of individual coloured powders very interesting multicoloured combinations are obtained, which everyone can mix and influence by him-/herself with his/her own selection of hues of the used powder watercolour paints.

INDUSTRIAL APPLICABILITY

These paints are presented in the form of dry particles coated by special white filler. They can be used to paint on watercolour or standard paper etc. in an interesting and innovative way. It looks like a magic with colours is carried out. The paints are exclusively used without water (water is only used to clean the brush or working surface), before further painting the brush must be dried.

The paint can be used to paint with one colour only, or the particles of individual colours can be mixed and spread simultaneously while each particle is spread in its own hue, the colour hues do not change (e.g. the yellow and blue colour do not produce a green hue, but yellow and white traces are visible on the paper).

What is claimed is:

1. Powder water colour paint comprising:
   a) powder filler having hydrophobic treatment and in said powder filler encased/dispersed
   b) particles of an aqueous liquid coloured base containing in each case, based on the ingredient b), 0.5 to 10% by weight of coloured pigment or pigment paste, 1.5 to 5% by weight of natural or synthetic gum, 1 to 5% by weight of a hydrophobizing oil ingredient, where the balance up to 100% by weight of the ingredient b) consists of water and optionally other common additives for aqueous paint systems,
   wherein the ratio is 5 to 20 weight parts of the ingredient b) to each 1 weight part of the ingredient a).

2. The powder watercolour paint according to claim 1, wherein the powder filler is selected from the group of natural or synthetic oxides, silicates or aluminosilicates, optionally hydrated forms thereof.

3. The powder watercolour paint of claim 2, wherein the powder filler is silicon dioxide.

4. The powder watercolour paint of claim 1, wherein the hydrophobic treatment of the powder filler is achieved with the use of a non-polar substance from the group of natural or synthetic solid or liquid hydrocarbons, waxes, fats, oils and synthetic siloxanes.

5. The powder watercolour paint of claim 1, wherein the content of water in the ingredient a) is lower than 20% by weight.

6. The powder watercolour paint of claim 1, wherein the average particle size of the ingredient a) is less than 100 pm.

7. The powder watercolour paint of claim 1, wherein the ingredient b) contains up to 5% by weight of white pigment or pigment paste.

8. The powder watercolour paint of claim 1, wherein the hydrophobizing oily component in the ingredient b) is silicone oil.

9. The powder watercolour paint of claim 1, wherein the natural or synthetic gum in the ingredient b) is guar gum or xanthan gum.

10. The powder watercolour paint of claim 1 according to any of the previous claims, characterized in that the viscosity of the ingredient b) is 100 to 5000 mPa·s.

11. The powder watercolour paint of claim 1, wherein the mean diameter of particles of the ingredient b) of the powder watercolor paint is 0.5 to 5 mm.

12. The powder watercolour paint of claim 1, wherein said paint in its ingredient b) contains at least one of other common additives selected independently from the group consisting of a soluble dye, organic water-miscible solvent, glycerol, organic or inorganic acid, dispersing agent, defoaming agent, sodium or potassium hydroxide, natural gum, carboxymethyl cellulose, pearling agent and metallic particles.

* * * * *